United States Patent
Bhavaraju et al.

(10) Patent No.: US 9,502,904 B2
(45) Date of Patent: Nov. 22, 2016

(54) POWER CONVERSION SYSTEM AND METHOD PROVIDING MAXIMUM EFFICIENCY OF POWER CONVERSION FOR A PHOTOVOLTAIC SYSTEM, AND PHOTOVOLTAIC SYSTEM EMPLOYING A PHOTOVOLTAIC ARRAY AND AN ENERGY STORAGE DEVICE

(75) Inventors: Vijay Bhavaraju, Germantown, WI (US); Richard P. Peplinski, Brookfield, WI (US); Anish Prasai, Vienna, VA (US)

(73) Assignee: EATON CORPORATION, Cleveland (UY)

( * ) Notice: Subject to any disclaimer, the term of this patent is extended or adjusted under 35 U.S.C. 154(b) by 950 days.

(21) Appl. No.: 12/729,304

(22) Filed: Mar. 23, 2010

(65) Prior Publication Data

US 2011/0232714 A1    Sep. 29, 2011

(51) Int. Cl.
| H02J 3/00 | (2006.01) |
| H02J 3/38 | (2006.01) |
| H02J 3/32 | (2006.01) |
| H02J 7/35 | (2006.01) |

(52) U.S. Cl.
CPC ............ H02J 3/385 (2013.01); H02J 3/32 (2013.01); H02J 7/35 (2013.01); Y02E 10/566 (2013.01); Y02E 10/58 (2013.01); Y10T 307/707 (2015.04)

(58) Field of Classification Search
USPC ...................................................... 307/82, 85
See application file for complete search history.

(56) References Cited

U.S. PATENT DOCUMENTS

| 4,375,662 A | 3/1983 | Baker |
| 4,404,472 A | 9/1983 | Steigerwald |
| 4,445,049 A | 4/1984 | Steigerwald |
| 4,494,180 A | 1/1985 | Streater et al. |
| 4,580,090 A | 4/1986 | Bailey et al. |
| 4,678,983 A | 7/1987 | Rouzies |
| 4,750,102 A | 6/1988 | Yamano et al. |
| 4,916,382 A | 4/1990 | Kent |
| 5,114,101 A | 5/1992 | Stern et al. |
| 5,268,832 A | 12/1993 | Kandatsu |
| 5,493,155 A | 2/1996 | Okamoto et al. |
| 5,493,204 A | 2/1996 | Caldwell |
| 5,604,430 A | 2/1997 | Decker et al. |
| 5,719,758 A | 2/1998 | Nakata et al. |
| 5,747,967 A | 5/1998 | Muljadi et al. |
| 5,869,956 A | 2/1999 | Nagao et al. |
| 5,896,281 A | 4/1999 | Bingley |
| 5,923,100 A | 7/1999 | Lukens et al. |
| 6,091,015 A | 7/2000 | del Valle et al. |
| 6,111,767 A | 8/2000 | Handleman |
| 6,207,889 B1 | 3/2001 | Toyomura et al. |
| 6,232,742 B1 | 5/2001 | Wacknov et al. |
| 6,255,804 B1 | 7/2001 | Herniter et al. |
| 6,281,485 B1 | 8/2001 | Siri |
| 6,285,572 B1 | 9/2001 | Onizuka et al. |
| 6,327,994 B1 | 12/2001 | Labrador |

(Continued)

*Primary Examiner* — Rexford Barnie
*Assistant Examiner* — Toan Vu
(74) *Attorney, Agent, or Firm* — Eckert Seamans; Kirk Houser; Philip Levy

(57) ABSTRACT

A power conversion system includes a number of photovoltaic arrays, a number of inverters, a transformer, and processor. The processor is structured to control the number of inverters and operate the power conversion system to provide maximum efficiency of power conversion by the number of photovoltaic arrays, the number of inverters and the transformer, and to maximize power output from the number of photovoltaic arrays.

7 Claims, 9 Drawing Sheets

(56) References Cited

U.S. PATENT DOCUMENTS

| | | |
|---|---|---|
| 6,339,538 B1 | 1/2002 | Handleman |
| 6,344,985 B1 | 2/2002 | Akerson |
| 6,369,462 B1 | 4/2002 | Siri |
| 6,429,546 B1 | 8/2002 | Ropp et al. |
| 6,433,522 B1 | 8/2002 | Siri |
| 6,528,977 B2 | 3/2003 | Arakawa |
| 6,590,793 B1 | 7/2003 | Nagao et al. |
| 6,690,590 B2 | 2/2004 | Stamenic et al. |
| 6,844,739 B2 | 1/2005 | Kasai et al. |
| 6,884,934 B2 | 4/2005 | Tsuzuki et al. |
| 6,914,418 B2 | 7/2005 | Sung |
| 6,940,735 B2 | 9/2005 | Deng et al. |
| 6,949,843 B2 | 9/2005 | Dubovsky |
| 6,984,970 B2 | 1/2006 | Capel |
| 7,053,506 B2 | 5/2006 | Alonso et al. |
| 7,072,195 B2 | 7/2006 | Xu |
| 7,091,707 B2 | 8/2006 | Cutler |
| 7,126,294 B2 | 10/2006 | Minami et al. |
| 7,148,650 B1 | 12/2006 | McNulty et al. |
| 7,158,395 B2 | 1/2007 | Deng et al. |
| 7,193,872 B2 | 3/2007 | Siri |
| 7,248,946 B2 | 7/2007 | Bashaw et al. |
| 7,256,566 B2 | 8/2007 | Bhavaraju et al. |
| 7,319,313 B2 | 1/2008 | Dickerson et al. |
| 7,324,361 B2 | 1/2008 | Siri |
| 7,394,237 B2 | 7/2008 | Chou et al. |
| 7,420,354 B2 | 9/2008 | Cutler |
| 7,432,691 B2 | 10/2008 | Cutler |
| 7,463,500 B2 | 12/2008 | West |
| 7,466,571 B2 | 12/2008 | Deng et al. |
| 7,471,073 B2 | 12/2008 | Bettenwort et al. |
| 7,479,774 B2 | 1/2009 | Wai et al. |
| 7,521,914 B2 | 4/2009 | Dickerson et al. |
| 7,619,200 B1 | 11/2009 | Seymour et al. |
| 7,656,059 B2 | 2/2010 | Wang et al. |
| 7,990,743 B2 * | 8/2011 | Walling et al. ................ 363/71 |
| 2005/0040711 A1 * | 2/2005 | West ............................... 307/82 |
| 2005/0110454 A1 | 5/2005 | Tsai et al. |
| 2007/0027644 A1 | 2/2007 | Bettenwort et al. |
| 2007/0273338 A1 | 11/2007 | West |
| 2008/0018175 A1 | 1/2008 | McNamara et al. |
| 2008/0122293 A1 | 5/2008 | Ohm |
| 2009/0189574 A1 | 7/2009 | Le et al. |
| 2009/0217965 A1 | 9/2009 | Dougal et al. |
| 2009/0261655 A1 | 10/2009 | Kernahan |
| 2009/0283129 A1 | 11/2009 | Foss |
| 2009/0284998 A1 | 11/2009 | Zhang et al. |
| 2010/0001587 A1 | 1/2010 | Casey et al. |
| 2010/0002470 A1 | 1/2010 | Kiamilev et al. |
| 2010/0008119 A1 * | 1/2010 | O'Brien et al. ............. 363/132 |
| 2010/0032002 A1 | 2/2010 | Seymour et al. |
| 2010/0283325 A1 * | 11/2010 | Marcianesi et al. ........... 307/82 |

* cited by examiner

POWER CONVERSION SYSTEM AND METHOD PROVIDING MAXIMUM EFFICIENCY OF POWER CONVERSION FOR A PHOTOVOLTAIC SYSTEM, AND PHOTOVOLTAIC SYSTEM EMPLOYING A PHOTOVOLTAIC ARRAY AND AN ENERGY STORAGE DEVICE

BACKGROUND

Field

The disclosed concept pertains generally to converting energy from photovoltaic (PV) arrays and, more particularly, to power conversion systems for a PV system. The invention further pertains to methods of power conversion for a PV system. The invention also pertains to PV systems.

Background Information

Photovoltaic (PV) arrays are typically configured in a series/parallel arrangement of a plurality of PV modules. The conventional practice is to ensure that the generated direct current (DC) voltage of a string of PV modules, under worst case conditions, does not exceed the insulation ratings of the PV modules. For example, the National Electric Code (NEC) requires this voltage to be under 600 VDC.

An example PV array/inverter system 2 is shown in FIG. 1. Each of two example PV arrays 4,6 consists of a number of strings 8 of PV modules 10 electrically connected in parallel before the corresponding PV array is electrically connected to an inverter 12.

The power output of a PV module for a level of solar radiation depends, for example, on the temperature of the PV module, the condition of the PV module surface, the age of the PV module, and the technology of the PV module. However, the general characteristics of the PV array DC voltage (volts) 14, PV array DC current (amperes) 16 and PV array DC power output (watts) 18 with respect to 100% solar radiation (i.e., "insolation") 20 are shown in FIG. 2. A plot 22 of the array output current versus the array output voltage is also shown.

Referring again to FIG. 1, the DC power from the PV arrays 4,6 is converted into alternating current (AC) power by a power converter (e.g., the inverter 12) before, for example, being injected into a utility grid 24. The power converter 12 preferably ensures that the DC power from the PV arrays 4,6 is maximized. The maximization of energy from the PV arrays 4,6 is done by continuously changing the operating point based on the Sun's radiation and the temperature of the PV modules 10. However, there are various efficiencies of conversion from DC power to AC power. For example, the power conversion can be made with more than one power converter (not shown). When more than one power converter is used, the efficiency is dependent on the operating point of the various power converters. In addition, a sub-array connected to each power converter could have a different operating sub-array voltage for maximum power.

In this power conversion process, there is an additional inefficiency in the transformer 26 between the inverter 12 and the utility grid 24. Example efficiency curves 28,30 of the inverter 12 and the transformer 26 have convex characteristics as shown in FIG. 3. The inverter efficiency depends mainly on the input DC voltage, inverter switching frequency and operating current. The efficiency of the transformer 26 is dependent on the design and operating point.

There is room for improvement in power conversion systems for a PV system.

There is also room for improvement in methods of power conversion for a PV system.

There is further room for improvement in PV systems.

SUMMARY

Since the cost of solar modules and their installation is relatively high, extracting maximum energy from a photovoltaic (PV) array, an inverter and a transformer is very important for the economic feasibility of solar PV power conversion.

During the day, as the sunlight conditions and the temperature of PV modules change, operating a PV array, an inverter and a transformer at their respective maximum efficiencies is important. The transformer efficiency is fixed for a design and the efficiency characteristics of the transformer are chosen to have the highest efficiency at near 100% when the inverter is not at its peak efficiency.

Two or more inverters can be operated to maximize PV array outputs individually. Based on the output AC power, the number of inverters and the number of independent PV arrays can be advantageously selected.

When energy storage is available, the system can be optimized for economics in addition to energy conversion efficiency.

These needs and others are met by embodiments of the disclosed concept, which maximize energy injected into a utility grid and/or a load by operating a PV system (e.g., without limitation, a PV array, a corresponding energy converter and a single transformer) at the maximum efficiency of conversion in addition to maximizing the output from the PV array.

In accordance with one aspect of the disclosed concept, a method of power tracking is for a photovoltaic system including a number of photovoltaic arrays, a number of inverters, and a transformer. The method comprises: operating the photovoltaic system including the number of photovoltaic arrays, the number of inverters and the transformer to provide maximum efficiency of power conversion therefrom; and maximizing power output from the number of photovoltaic arrays.

The method may further comprise employing as the number of photovoltaic arrays a plurality of photovoltaic arrays, and paralleling the outputs of the plurality of photovoltaic arrays.

The method may further comprise employing as the number of photovoltaic arrays a plurality of photovoltaic arrays; employing as the number of inverters a plurality of inverters; for each of the plurality of photovoltaic arrays, powering a corresponding one of the plurality of inverters from a corresponding one of the plurality of photovoltaic arrays; and operating each of the plurality of photovoltaic arrays at a corresponding independent maximum power point during a time of about peak or peak energy production.

The method may further comprise determining energy and power at a utility grid, determining the loading on the number of inverters and the transformer, and operating the system at optimal stress levels.

The method may further comprise employing two photovoltaic arrays as the number of photovoltaic arrays, employing two inverters as the number of inverters, initially paralleling the outputs of the two photovoltaic arrays and powering one of the two inverters from the paralleled outputs, determining when power output from the one of the two inverters exceeds a predetermined power percentage and responsively powering the one of the two inverters from one of the two photovoltaic arrays and powering the other one of the two inverters from the other one of the two photovoltaic arrays, operating the one of the two inverters at the maximum power point of the one of the two photovoltaic arrays, and operating the other one of the two inverters at the maximum power point of the other one of the two photovoltaic arrays.

The method may further comprise determining when power output from both of the two inverters falls below a predetermined power percentage; and determining when the one of the two inverters has operated for longer than a predetermined time during a predetermined time interval, and responsively disabling the one of the two inverters, paralleling the outputs of the two photovoltaic arrays and powering the other one of the two inverters from the paralleled outputs.

As another aspect of the disclosed concept, a photovoltaic system comprises: an energy storage device; a photovoltaic array; a converter including a first input/output structured to input power from or output power to the energy storage device, and a second input/output structured to input power or output power; an inverter including an input structured to input power from the photovoltaic array and an output structured to output power; and a transformer having a primary electrically connected to the output of the inverter and to the second input/output of the converter, and a secondary electrically connected to at least one of a local load and a utility grid.

The first input/output of the converter may input power from the energy storage device, the second input/output of the converter may output power, and the local load may be powered through the transformer by both of the converter and the inverter.

The converter may be structured to operate as a voltage source and set the frequency and the voltage of the local load using available power from the energy storage device.

The first input/output of the converter may output power to the energy storage device, the second input/output of the converter may input power, and the local load may be powered through the transformer by the inverter.

The converter may be an active rectifier structured to charge the energy storage device.

The second input/output of the active rectifier may be powered through the transformer from the utility grid.

The first input/output of the converter may output power to the energy storage device, and the second input/output of the converter may input power from the output of the inverter.

Neither one of the local load or the utility grid may be powered, and the second input/output of the converter may input power directly from the output of the inverter.

The secondary of the transformer may only be electrically connected to the local load, the first input/output of the converter may input power from the energy storage device, the second input/output of the converter may output power, and the local load may be powered through the transformer by both of the converter and the inverter.

The converter may be structured to operate as a voltage source and set the frequency and the voltage of the local load, and the inverter may be structured to track the frequency and the voltage of the local load.

As another aspect of the disclosed concept, a power conversion system comprises: a number of photovoltaic arrays; a number of inverters; a transformer; and a processor structured to control the number of inverters and operate the power conversion system to provide maximum efficiency of power conversion by the number of photovoltaic arrays, the number of inverters and the transformer, and to maximize power output from the number of photovoltaic arrays.

The number of photovoltaic arrays may be two photovoltaic arrays each having an output, the number of inverters may be two inverters, and the processor may be structured to selectively cause: (a) a corresponding one of the inverters to be powered from a corresponding one of the two photovoltaic arrays; or (b) the outputs of the two photovoltaic arrays to be electrically connected in parallel and one of the two inverters to be powered from the paralleled outputs.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; a controller; a system controller; a programmable logic controller; or any suitable processing device or apparatus.

As employed herein, the term "inverter" means an apparatus or device that converts electrical energy from a direct current form to an alternating current form.

As employed herein, the term "converter" means an apparatus or device that converts electrical energy in a first direction from a direct current form to an alternating current form (e.g., without limitation, functioning as an inverter powered from a direct current energy storage device), and/or that converts electrical energy in an opposite second direction from an alternating current form to a direct current form (e.g., without limitation, functioning as an active rectifier or other rectifier to charge a direct current energy storage device).

Figure 4:
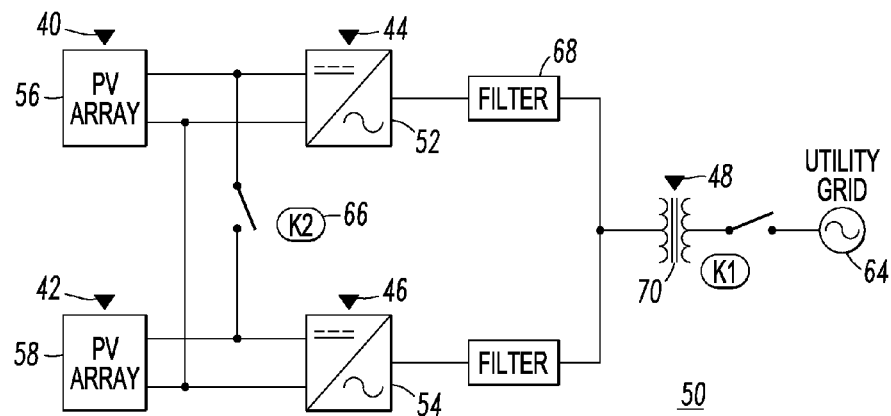
FIG. 4 is a block diagram of a power conversion system in accordance with embodiments of the disclosed concept.

Referring to FIG. 4, different energy conversion efficiencies are shown in triangles 40,42,44,46,48 in a multi-inverter power conversion system 50. At each of these triangles, there is an operating point for maximum power. Based on the power available, the power conversion system 50 can be reconfigured for the best efficiency of conversion. An alternative configuration of this power conversion system 50 could be with individual transformers (not shown) for the two example inverters 52,54, although the one transformer 70 has a relatively higher efficiency than two transformers.

The example power conversion system 50 includes three different example modes of operation: (1) each of two example inverters 52,54 operates at the maximum power point of the corresponding PV array 56,58, respectively, electrically connected thereto; (2) the first inverter 52 only operates with the two PV arrays 56,58 electrically connected to that inverter; and (3) the second inverter 54 only operates with the two PV arrays 52,54 electrically connected to that inverter.

The example power conversion system 50 includes two inverters 52,54 and two PV arrays 56,58 (e.g., without limitation, of different sizes) connected to the two inverters 52,54, respectively. When the combined PV array output is below the capacity of one inverter, only one inverter 52 or 54 is operated. Then, this inverter maximizes the power output from the combined PV arrays 56,58. When the combined PV array output is greater than the capacity of one inverter 52 or 54, the PV arrays 56,58 are split between the two respective inverters 52,54. The two inverters 52,54 then operate the respective PV arrays 56,58 at their respective peak power output. The two inverters 52,54 preferably transition between the two PV arrays 56,58 smoothly by adjusting the PV array voltages each time before disconnecting or connecting the PV arrays. It will be appreciated that although two example inverters are shown, this and other power conversions systems can operate with more than two inverters.

Figure 6:
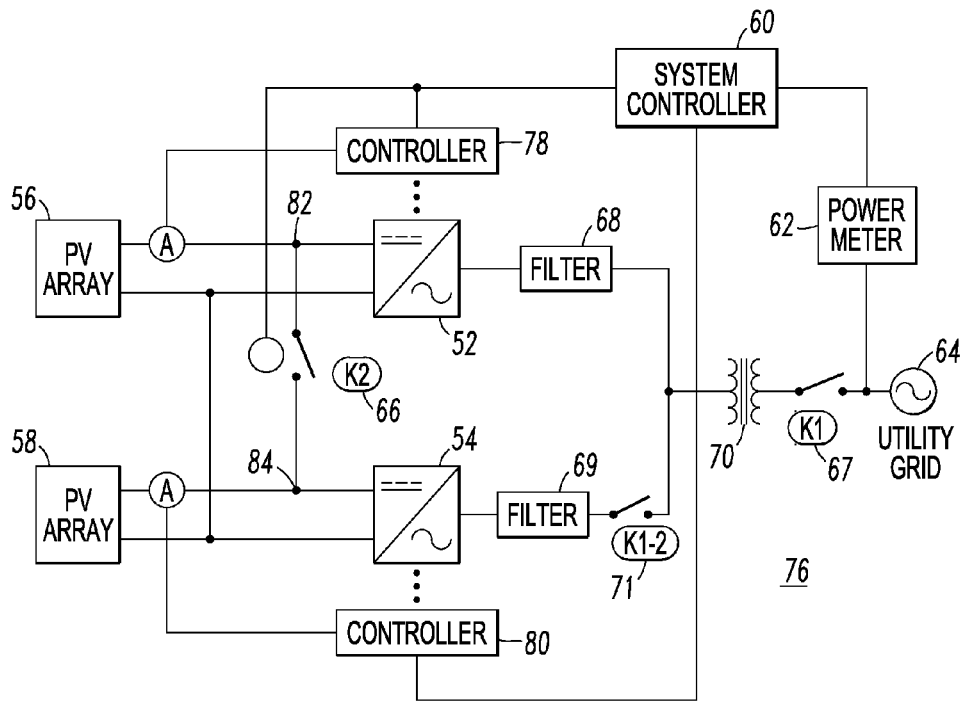
FIG. 6 is a block diagram in schematic form of the power conversion system of FIG. 4 including system controls.

In the second mode of operation, a processor, such as a system controller 60 (e.g., without limitation, a programmable logic controller (PLC)) (FIG. 6) communicates (e.g., without limitation, using a suitable communication channel or network; Modbus; RS-485) with the two inverters 52,54 and with a power meter 62 (FIG. 6). For example, every day, the first inverter 52 wakes up in the morning, electrically connects to the utility grid 64 and exports power to the utility grid with contactor K2 66 closed (i.e., the outputs of both PV arrays 56,58 being electrically connected).

As the day progresses, the power output increases as well as the losses from the first inverter 52, its filter 68 and the transformer 70. When the output of the first inverter 52 reaches a suitable predetermined power percentage (e.g., without limitation, about 80%; any suitable percentage) as measured by the power meter 62, the losses in the first inverter 52 will exceed the losses if both inverters 52,54 would operate. The predetermined power percentage is used by the system controller 60 to switch the second inverter 54 on and open contactor K2 66 (as is shown). This is the first mode of operation in which the two inverters 52,54 operate and share the PV array energy of their respective PV arrays 56,58. The first inverter 52 operates at the maximum power point of the PV array 56 and the second inverter 54 operates at the maximum power point of the PV array 58. Together, the two inverters 52,54 have a relatively higher energy and power efficiency than one inverter 52 or 54 operating alone. On a cloudy day, only one inverter 52 or 54 could operate entirely, thereby saving considerable losses if both inverters 52,54 were to operate together or if one relatively large inverter (not shown) was employed, thus increasing the energy output from the PV arrays 56,58.

The control employed by the inverters 52,54 to maximize energy from their respective PV arrays 56,58 is discussed, below, in connection with FIG. 8. When the total power percentage falls below the suitable predetermined power percentage (e.g., without limitation, about 80%; any suitable percentage) and when the first inverter 52, for example, has operated for more than a predetermined time for the day (e.g., without limitation, 4 hours; any suitable time), the first inverter 52 is turned off and the contactor K2 66 is closed with the second inverter 54 taking the full output of the two PV arrays 56,58. This third mode of operation ensures equal or about equal number of hours of operation of the two inverters 52,54.

As will be discussed in connection with FIGS. 7 and 8, the power conversion system 50 operates the example PV arrays 56,58, the example inverters 52,54 and the example transformer 70 to provide maximum efficiency of power conversion therefrom. See, for example, the peak of the second system plot 92 of FIG. 7 for a desired percent power output to the utility grid 64 of FIG. 4 or a local load (not shown).

Figure 1:
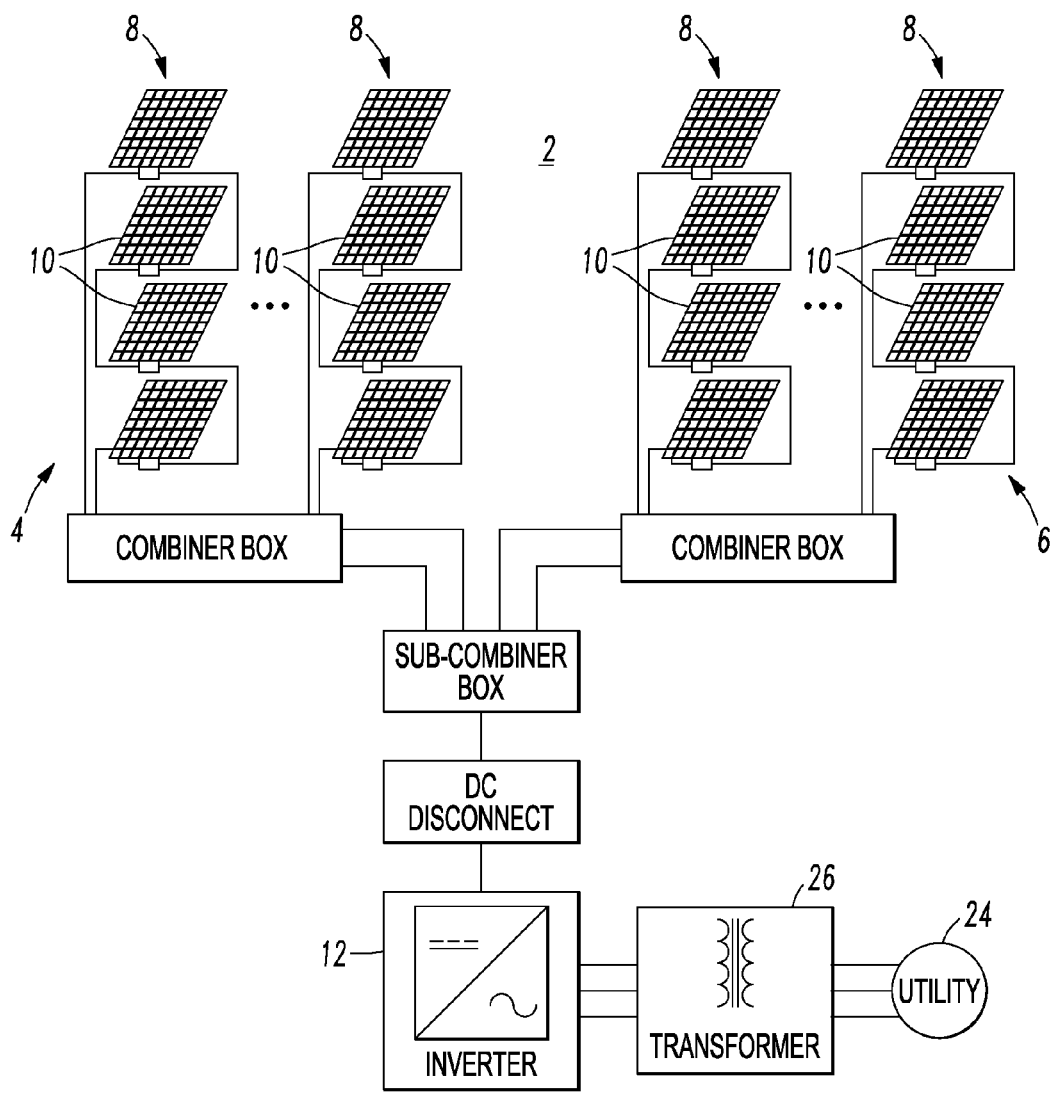
FIG. 1 is a block diagram of a photovoltaic (PV) array/inverter system.
Figure 2:
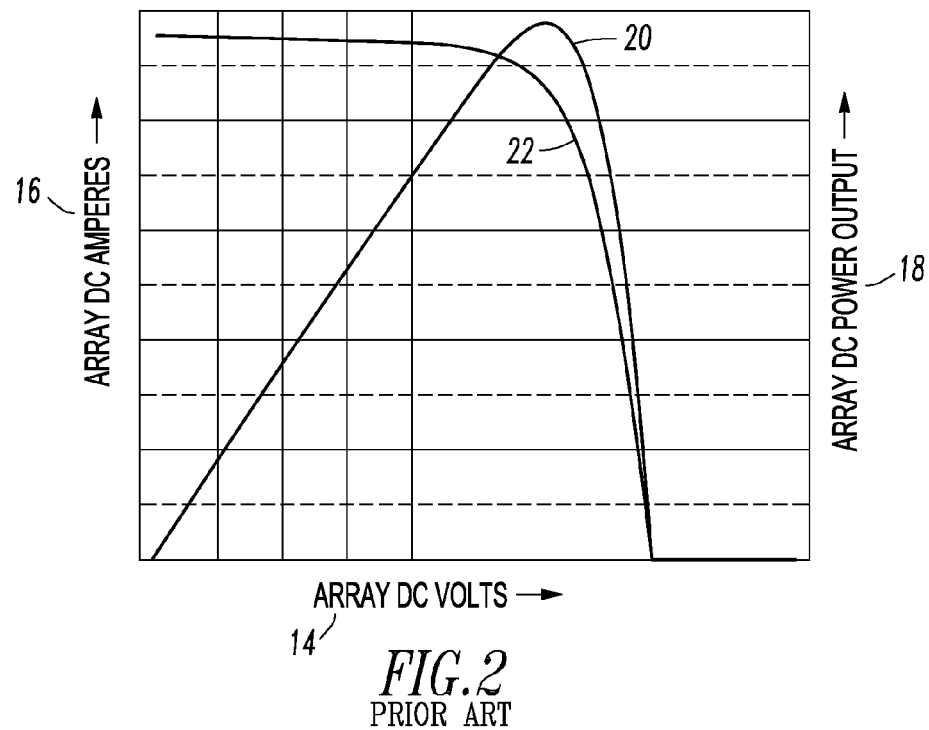
FIG. 2 is a plot of PV array voltage, current and power output with respect to 100% solar radiation (i.e., "insolation").
Figure 3:
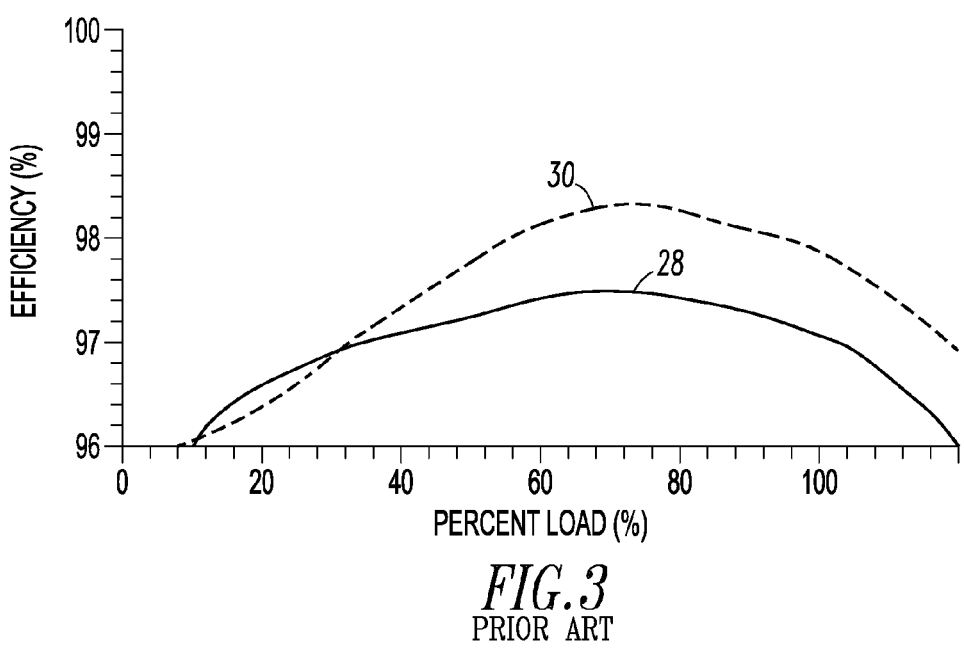
FIG. 3 is a plot of efficiency versus percent load for a transformer and an inverter.
Figure 5:
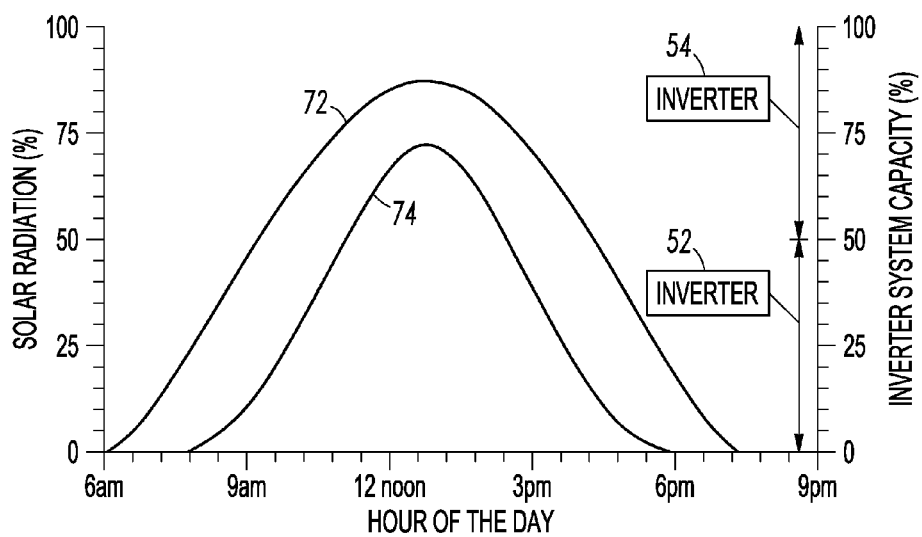
FIG. 5 is a plot of solar radiation, time of the day and inverter system capacity showing a seasonal variation of solar energy capacity utilization for the power conversion system of FIG. 4.

FIG. 5 shows plots 72,74 of example typical daily variation of solar radiation at a location employing "tracking" (not to be confused with power point tracking) PV arrays, such as the example PV arrays 56,58 of FIG. 4. For example, such tracking PV arrays can employ two axes or three axes (not shown) that track the sun and keep the PV modules (not shown, but see the PV modules 10 of FIG. 1) perpendicular to the incident solar radiation. Fixed PV arrays (e.g., having a fixed angle with respect to the sun) (not shown) do not track the sun's movement during the day and have a slightly narrower curve than that of the PV arrays 56,58. There is also a seasonal variation between the example summer plot 72 and the example winter plot 74. In all cases, the inverters 52,54 are not operating at full capacity during a good portion of the day and, thus, there is the opportunity to select the best configuration using a suitable routine as will be discussed, below, in connection with FIG. 8. For example and without limitation, the outputs of the PV arrays 56,58 can be paralleled during a number of hours before noon and a number of hours after noon, in order to provide a relatively higher energy output and balance the usage of the inverters 52,54.

A power conversion system 76 including a suitable system control architecture is shown in FIG. 6. The two example inverter controllers 78,80, which are controlled by the system controller 60, operate the two example inverters 52,54 in grid parallel mode (e.g., defined by IEEE 1547 and UL 1741). The output power into the corresponding transformer 70 (only one transformer is shown in FIG. 6) at the output of the corresponding inverter 52 or 54 is controlled by the system controller 60. The power meter 62 electrically connected at the utility grid 64 suitably measures the three-phase power into the utility grid. The system controller 60 also controls the paralleling of the DC busses 82,84 into the two respective inverters 52,54. Based on the power output and the efficiency curves of the inverters 52,54, the system controller 60 decides whether the two inverters 52,54 operate separately or whether only one of the two inverters 52,54 operates. When the two inverters 52,54 are delivering power from the two separate PV arrays 56,58, the system controller 60 commands the two inverter outputs. The individual inverter controllers 78,80 then adjust the DC voltages across the corresponding PV arrays 56,58.

When necessary, the contactor K2 66 between the two DC busses 82,84 is closed or opened; during this process, the system controller 60 coordinates the transfer of power from one inverter 52 to the other inverter 54.

Figure 7:
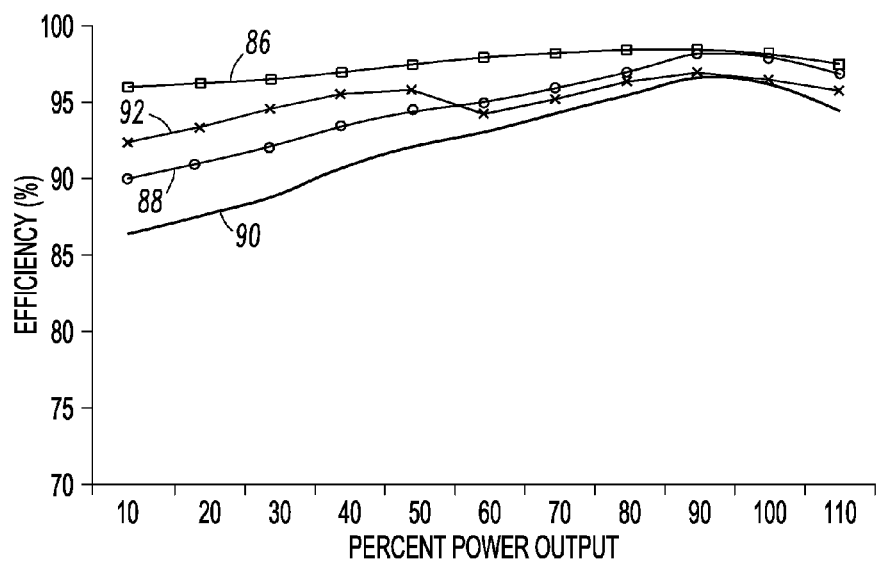
FIG. 7 is a plot of efficiency versus percent load for a transformer, an inverter and the power conversion system of FIG. 4.

FIG. 7 includes plots 86,88,90 of efficiency (%) versus percent power output (load) for the respective transformer 70, one of the two inverters 52,54, and the system 50 of FIG. 4. The system efficiency with normal operation of both inverters 52,54 operational all the time is shown by the system plot 90. Improved system efficiency with one of the two inverters 52,54 operating for 50% of the power is shown by the second system plot 92. As can readily be seen, the efficiency can be higher at various percent power outputs, if the two inverters 52,54 are operated in a selective manner as will be discussed in connection with FIG. 8.

Figure 8:
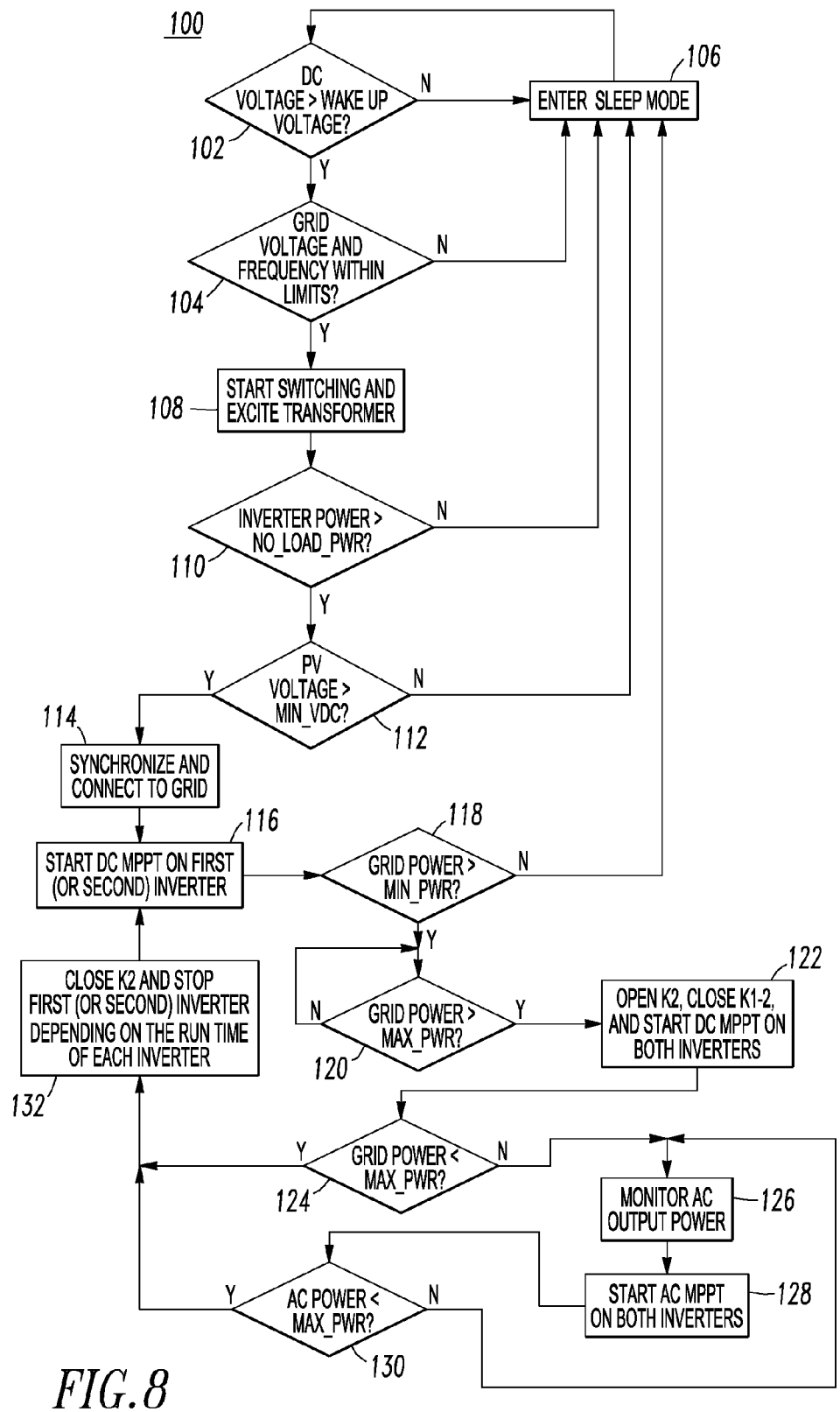
FIG. 8 is a flowchart of a routine executed by the system controller of FIG. 4.

FIG. 8 is a flowchart of a routine 100 executed by the system controller 60 of FIG. 4 including maximum power point tracking (MPPT). The inverter controllers 78,80 of FIG. 6 measure and report DC voltage from the respective PV arrays 56,58 to the system controller 60. First, at 102, the routine 100 determines if the DC voltage of the DC busses 82,84 with contactor K2 66 being closed is above a suitable wake up voltage (e.g., without limitation, 400 VDC). If so, then at 104, it is determined if the voltage and the frequency of the utility grid 64 are within desired limits. If not at either 102 or 104, a sleep mode is entered at 106. Then, after a suitable time, step 102 is repeated. Otherwise, if the utility grid voltage and frequency are within the desired limits, then, at 108, the system controller 60 commands one of the inverter controllers 78,80 to cause one of the respective inverters 52,54 to begin switching to excite the transformer 70.

Next, at 110, it is determined if the system output power of both inverters 52,54 (e.g., without limitation, as aggregated by the system controller 60 from the inverter controllers 78,80) is greater than a predetermined power value (e.g., without limitation, No_load_pwr=600 W). If not, then the sleep mode is entered at 106. On the other hand, if the inverter power is greater than the predetermined power value, then at 112, it is determined if the PV voltage (the DC voltage of the DC busses 82,84 with contactor K2 66 being closed) is above a predetermined value (e.g., without limitation, Min_Vdc=400 VDC). If not, then the sleep mode is entered at 106. Otherwise, if the PV DC voltage is greater than this predetermined value, then at 114, system controller 60 commands the inverter controllers 78,80 to cause the respective inverters 52,54 to synchronize with the utility grid 64 and then causes the contactor K1 67 to close.

After 114, at 116, the system controller 60 commands one of the two inverter controllers 78,80 to start DC MPPT on one of the respective inverters 52,54. At this stage of the routine 100, only the inverter controller 78 starts DC MPPT. Next, at 118, it is determined from the power meter 62 whether the power to the utility grid 64 is greater than a predetermined value (e.g., without limitation, Min_Pwr=200 W). If not, then the sleep mode is entered at 106. On the other hand, if the power to the utility grid 64 is greater than this predetermined value, then at 120, it is determined from the power meter 62 whether the power to the utility grid 64 is greater than a predetermined value (e.g., without limitation, 80%; Max_Pwr=110 kW or 85% of the rating of the inverters 52,54; Max_Pwr=100 kW or 80% of the rating of the inverters 52,54; any suitable value). If so, then at 122, the contactor K2 66 is opened, the contactor K1-2 71 is closed, and the system controller 60 commands both of the two inverter controllers 78,80 to start DC MPPT on both of the respective inverters 52,54. This operates each of the PV arrays 56,58 at a corresponding independent maximum power point during a time of about peak or peak energy production, in order to provide better energy efficiency.

Next, at 124, it is determined from the power meter 62 whether the power to the utility grid 64 is less than a predetermined value (e.g., without limitation, 80%; Max_Pwr; 80% out of 200% for one inverter 52,54; any suitable value). If not, then at 126, the AC output power of both inverters 52,54 is monitored (e.g., employing the power meter 62 or by aggregating the outputs in the system controller 60) after which, at 128, AC MPPT is started on both inverters 52,54. The system controller 60 is preprogrammed with efficiency curves of the combined inverter and transformer system for selecting the maximum efficiency point for operation. To operate at the desired operating point, the inverters 52,54 setup power limits to meet based on the combined system efficiency. The system controller 60 can integrate the AC power output from the power meter 62 to determine the output energy, or the power meter 62 can advantageously provide both power and energy values. In turn, this information can be employed by the system controller to determine loading (e.g., % power) of the inverters 52,54 and the transformer 70.

Next, at 130, it is determined (e.g., if the inverter outputs fall below the power limits) if the AC power is less than a predetermined value (e.g., Max_Pwr). If not, then step 126 is repeated. Otherwise, at 132, the contactor K2 66 is closed and one of the two inverters 52,54 is stopped depending upon the run time of each of the inverters 52,54, in order to enter the third mode of operation, which ensures equal or about equal number of hours of operation of the two inverters 52,54. For example and without limitation, step 132 can determine when one of the two inverters 52,54 has operated for longer than a predetermined time (e.g., without limitation, four hours; any suitable time) during a predetermined time interval (e.g., without limitation, one day; any suitable time). This operates the power conversion system 76 of FIG. 6 at optimal stress levels, in order to increase the life of the inverters 52,54. For example, by operating alternate inverters 52 or 54 daily, the inverter heat sink temperature variation (see FIG. 10) is reduced. After 132, step 116 is executed to start DC MPPT on the one of the two inverters 52,54 that is now running.

Figure 9:
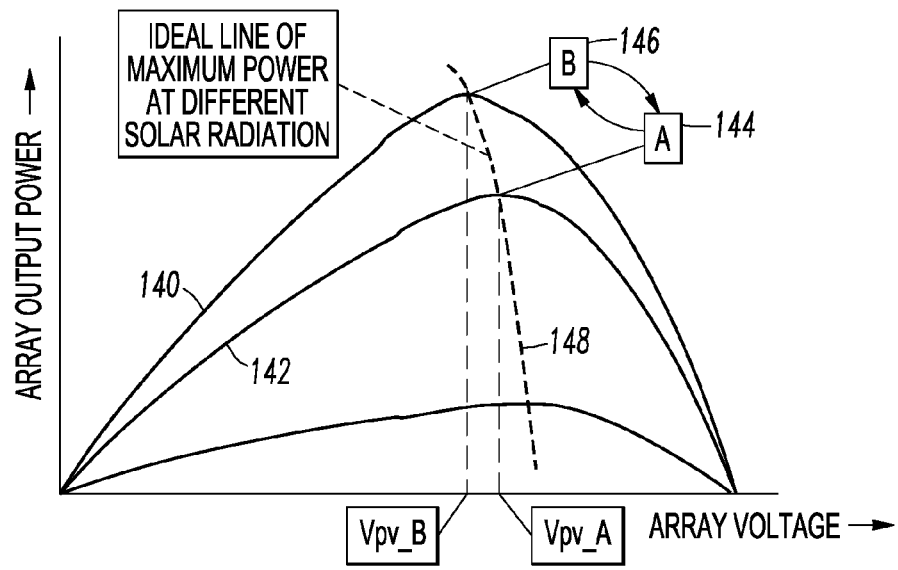
FIG. 9 is a plot of PV array output power and PV array output voltage for two different levels of solar radiation for the power conversion system of FIG. 4.

FIG. 9 shows plots 140,142 of PV array output power versus PV array output voltage for two different levels of solar radiation (e.g., 100% radiation and 80% radiation, respectively) including an effective DC output voltage operating range for the inverter systems 50,76 of FIGS. 4 and 6. Using this information, the system controller 60 can determine the optimum PV array voltage for a given level of solar radiation, in order to operate the PV arrays 56,58 at maximum power output for a particular solar radiation. As the PV arrays 56,58 age, the power output at the same voltage will be lower. This method does not look for an absolute value of power, but looks for the maximum power.

Another consideration is control of the PV arrays 56,58 during the day. When the PV array output changes from point A 144 to point B 146, the inverter 52 or 54 sets the voltage at Vpv_B and stores the corresponding PV array voltage and current. After a suitable time delay, the inverter 52 or 54 looks for a change in current and determines if that current increased or decreased. Next, the positive sequence voltage at the utility grid 64 is used to determine if the grid voltage increased or decreased. Based on the sign of the change in current and the sign of the change in grid voltage, the inverter voltage set point 148 (shown in dotted line in FIG. 9) is moved to the right or to the left with respect to FIG. 9. This control ensures tracking of the power available from the PV array 56 or 58 and provides a stable operating voltage for the inverter 52 or 54 and the PV array 56 or 58. After each interval, the output power from the two inverters 52,54 combined is saved. This output power information is used to determine how many of the two example inverters 52,54 are to be on. When the two array voltages connected to the two inverters 52,54 are controlled to their respective $V_{mp}$ (voltage at maximum power), the efficiency can be higher due to variations in the PV arrays 56,58. The system controller 60 can have a learning capability or a user selected power level when the PV arrays 56,58 are separately controlled (this is achieved by opening contactor K2 66 of FIG. 6). This is because there can be PV array to PV array variations (e.g., without limitation, up to about 3%, which can be termed a mismatch factor) and transformer to transformer variations.

This can be combined with other operating system components, like transformers and inverters, at their maximum power point (see the triangles 40,42,44,46,48 of FIG. 4). The opening of contactor K2 66 can be determined with a learning algorithm in the system controller 60 as was described above.

Figure 10:
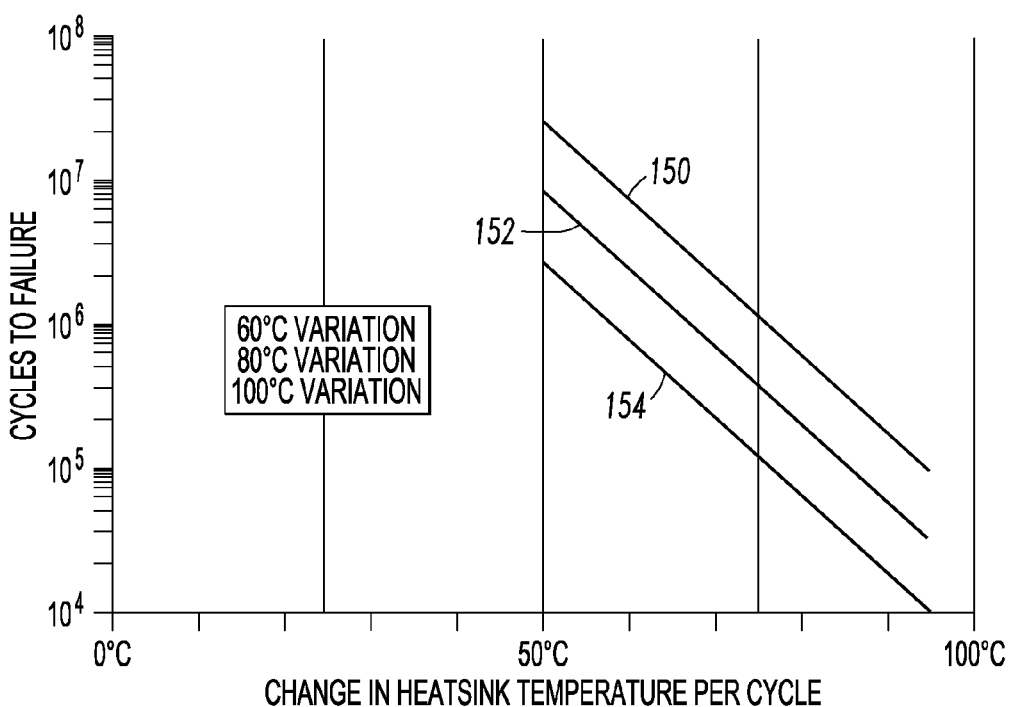
FIG. 10 is a plot of cycles to failure of inverters versus heatsink temperature change for the power conversion system of FIG. 4.

FIG. 10 shows plots 150,152,154 of the typical life of inverters (e.g., cycles to failure) versus temperature change. Since the disclosed method of using two inverters 52,54 rotates the one inverter (e.g., without limitation, inverter 52) that starts in the morning, the temperature change seen by the two inverters 52,54 is reduced by one-half. The second inverter (e.g., without limitation, inverter 54) that starts later in the day does not see the same temperature change since the enclosure (not shown) gets heated during the morning time.

Referring to FIGS. 11A-11E, two other example power conversion systems 160 (FIGS. 11A-11D) and 162 (FIG. 11E) include an energy storage device, such as an example storage battery 164, electrically connected to a first converter 166 and a PV array 176 electrically connected to a second inverter 170.

Figure 11A:
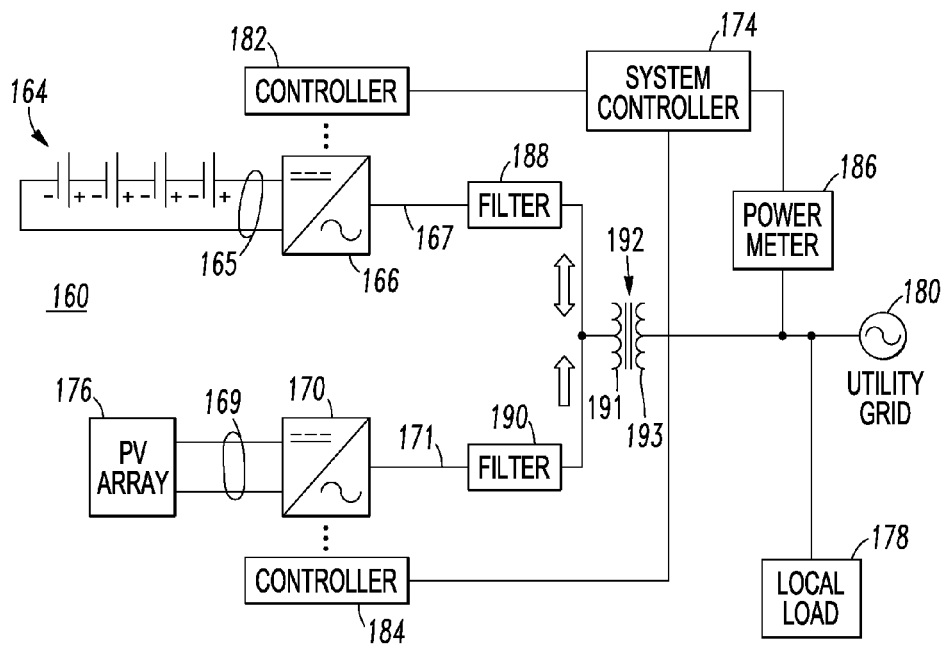
FIGS. 11A-11E are block diagrams of other power conversion systems including an energy storage device showing different operations to improve energy output of a PV array in accordance with other embodiments of the disclosed concept.
Figure 12:
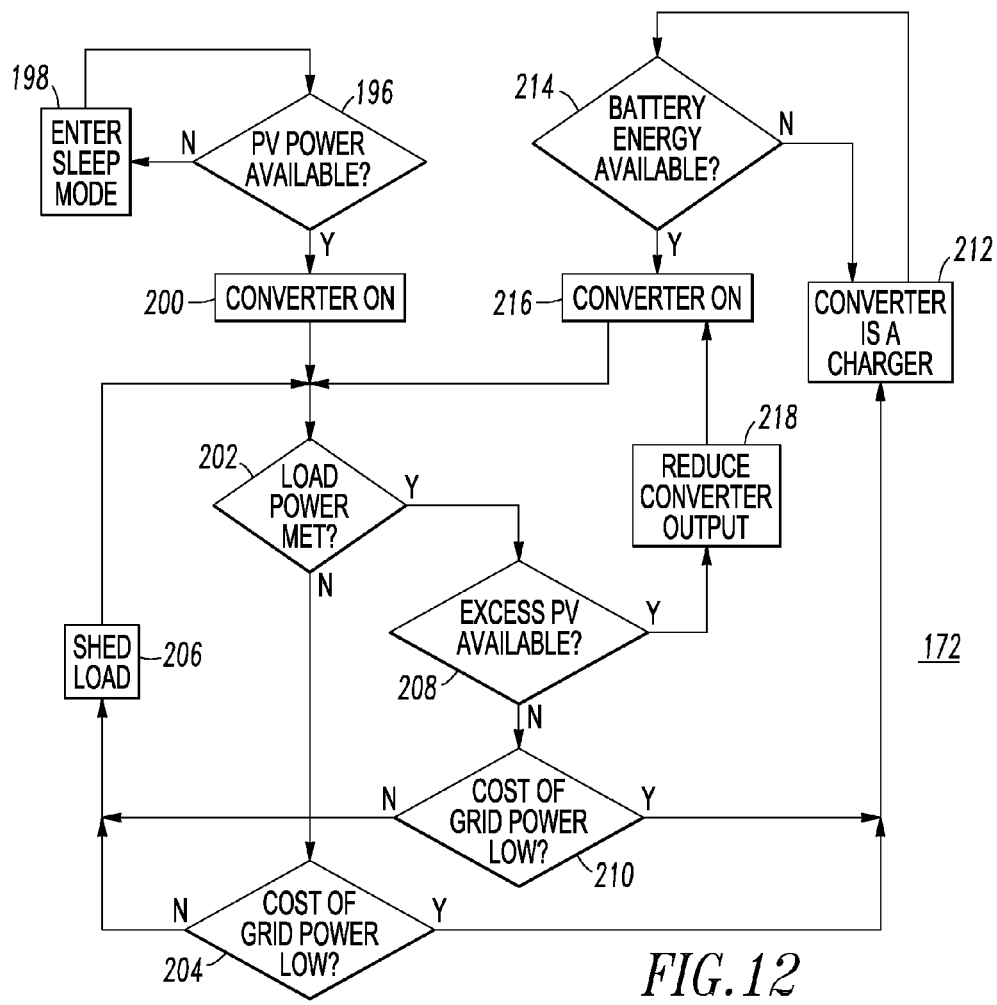
FIG. 12 is a flowchart of a routine executed by the system controller of FIG. 11A.

FIG. 12 shows a routine 172 executed by the system controller 174 of FIG. 11A. By employing the energy storage device 164 with the converter 166 and the PV array 176 with the inverter 170, the PV energy management is different than that of the power conversion system 50 of FIG. 4. The inverter 170 operates to maximize power from the PV array 176 and the converter 166 manages energy for the energy storage device 164. It is believed that such a system employing an energy storage device, a PV array, and multiple inverters and/or converters is novel and non-obvious.

Referring to FIG. 11A, the example inverter/converter power conversion system 160 including the PV array 176 and the energy storage device 164 is electrically connected to a local load 178 and to the example utility grid 180. In this power conversion system 160, the converter 166 is electrically connected to the energy storage device 164 (e.g., without limitation, a battery; an electric double-layer capacitor; a super-capacitor; an electrochemical double layer capacitor (EDLC); an ultra-capacitor) and the inverter 170 is electrically connected to the PV array 176. In this mode, the inverter 170 provides maximum power point tracking of the corresponding PV array 176 by continuously adjusting the PV array output voltage in order to receive the maximum power therefrom. The controllers 182,184, power meter 186, filters 188,190 and transformer 192 function in a manner similar to the respective controllers 78,80, power meter 62, filters 68,69 and transformer 70 of FIG. 6.

The converter 166 has a first input/output 165 structured to input power from or output power to the energy storage device 164, and a second input/output 167 structured to input power or output power. The inverter 170 has an input 169 structured to input power from the PV array 176 and an output 171 structured to output power. The transformer 192 includes a primary 191 electrically connected to the inverter output 171 by filter 190 and to the converter second input/output 167 by filter 188, and a secondary 193 electrically connected to at least one of the local load 178 and the utility grid 180.

Figure 11B:
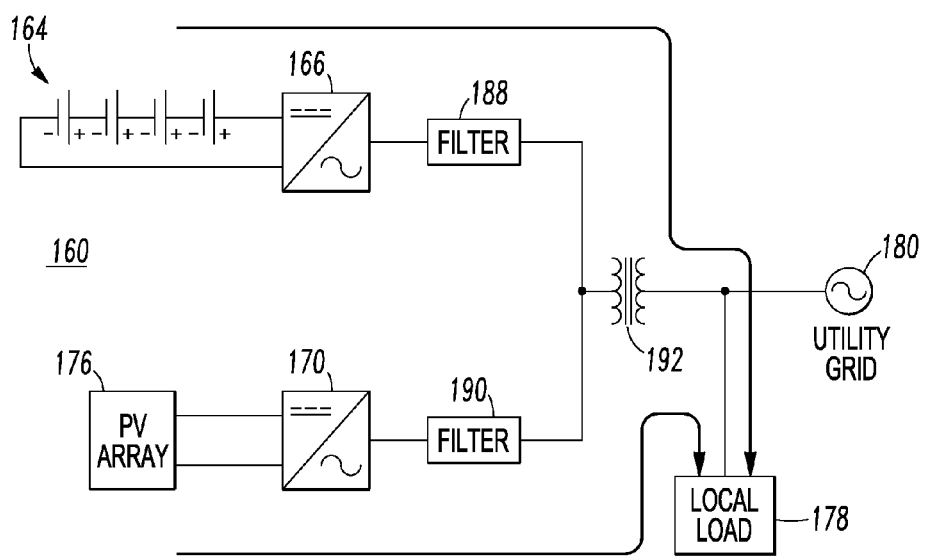

In FIG. 11B, while connected to the utility grid 180, the local load 178 is powered by both the PV array 176/inverter 170 and the energy storage device 164/converter 166. Hence, when the PV array output power and, thus, the output power from inverter 170 are insufficient to meet the requirements of the local load 178, the converter 166 supplements the power to the local load 178 by discharging the energy stored in the energy storage device 164 to the local load 178. In this mode, the converter 166 continuously manages the local load 178 depending on the available power from the inverter 170.

Figure 11C:
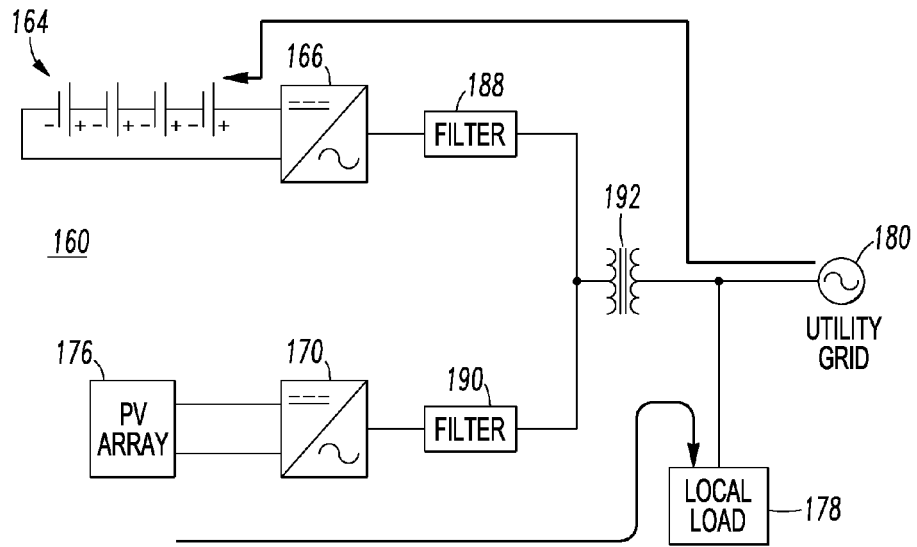

As shown in FIG. 11C, when the inverter 170 can deliver all the power to the local load 178/utility grid 180, the converter 166 changes control into, for example, an active rectifier and charges the energy storage device 164, as needed. The converter 166 can also charge the energy storage device 164 if the output power from the inverter 170 is in excess of the load requirements.

Figure 11D:
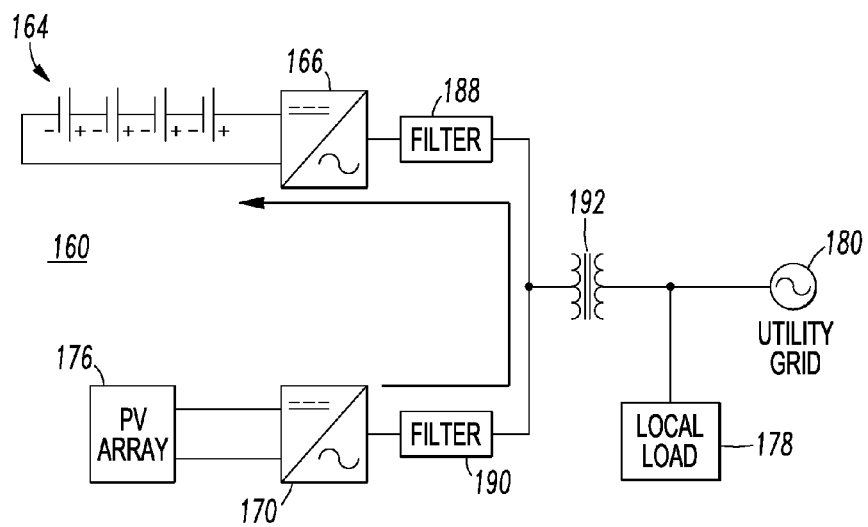

In FIG. 11D, no energy is delivered into the local load 178/utility grid 180 and all energy from the PV array 176/inverter 170 is used to charge the energy storage device 164 through the converter 166. The energy is not transferred from the PV array 176 to the energy storage device 164 through the output transformer 192 in this mode. It is believed that this is a novel and non-obvious feature of the power conversion system 160. This approach also increases the efficiency of the power conversion system 160 since the power is not transferred through the transformer 192, and the IGBTs (not shown) of the converter 166 need not be switching during most of the time. For example, the magnitude of the AC output voltage from the inverter 170 connected to the PV array 176 is higher than the DC voltage of the energy storage device 164. The converter 166 need not actively rectify the AC. For example, anti-parallel diodes (not shown) across the IGBTs (not shown) of the converter 166 can be employed for rectification.

Figure 11E:
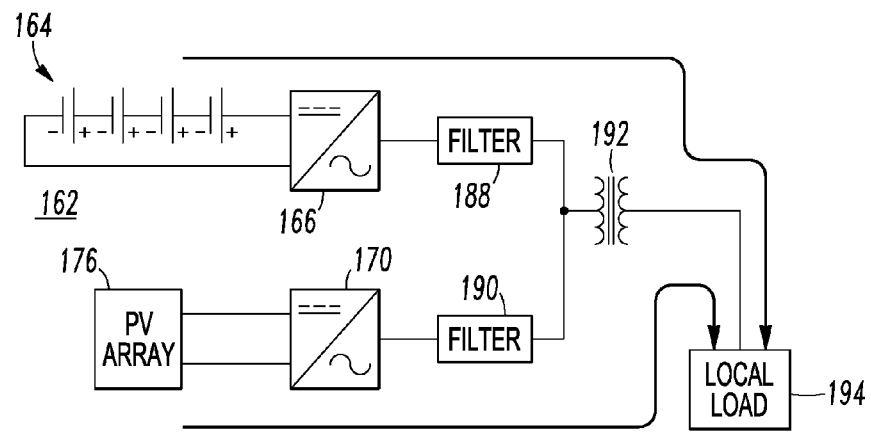

As shown in FIG. 11E, another inverter/converter power conversion system 162 powers a local load 194 and is not electrically connected to a utility grid (not shown). The converter 166 continuously operates as a voltage source setting the frequency and voltage of the local load 194 since the utility grid is absent. The inverter 170 operates in the grid-parallel mode, treating the output of the converter 166 in the same manner as the utility grid (not shown).

In FIGS. 11B and 11E, the load power demand is met by both of the PV array 176 and the energy storage device 164. The output energy from the PV array 176 can vary throughout the day since there is no control over when solar energy is available, and since the local load 178 or 194 can change as well, the converter 166 identifies the energy needs of the local load 178 or 194 and adjusts its output power to power the local load 178 or 194 continuously. In some cases, the energy from the PV array 176 can exceed the needs of the local load 178 or 194 (e.g., this can occur over weekends or holidays). In those cases, the converter 166 charges the energy storage device 164 and stores any excess energy from the PV array 176/inverter 170.

Referring to FIG. 12, although not shown, the routine 172 advantageously includes maximum power point tracking (MPPT) for the PV array 176, inverter 170 and transformer 192, as was discussed above in connection with FIGS. 4, 6 and 8. The converter 166 addresses the needs of the energy storage device 164 (i.e., charge or discharge). The inverter 170 always tracks the maximum power point of the PV array 176. However, in addition, the converter 166 adjusts its output voltage to charge the energy storage device 164 when not connected to the utility grid 180.

At 196 of the routine 172, it is determined if PV power is available from the PV array 176. If not, then a sleep mode is entered at 198. The sleep mode 198 periodically wakes up to recheck the test at 196. On the other hand, if the test passes, at 196, then at 200, the inverter 170 is turned on. Next, at 202, it is determined if the power of the local load 178 or 194 is met. If not, then at 204, it is determined if the cost of power from the utility grid 180 is suitably low. If not, then the local load 178 (or a suitable portion thereof) is shed at 206, after which step 202 is repeated. Otherwise, if the power of the local load 178 or 194 is met at 202, then at 208, it is determined if there is excess PV power available. If not, then at 210, it is determined if the cost of power from the utility grid 180 is suitably low. If not, then the local load 178 or 194 (or a suitable portion thereof) is shed at 206. On the other hand, if the cost of power from the utility grid 180 is suitably low at either 204 or 210, then at 212, the converter 166 operates as a charger. Next, at 214, it is determined if sufficient battery energy, for example, from the energy storage device 164 is available. If not, then step 212 is repeated. Otherwise, at 216, the converter 166 is turned on as an inverter after which step 202 is executed. On the other hand, if excess PV power is available at 208, then at 218, the output of the converter 166 is reduced before step 216 is executed.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of power tracking for a photovoltaic system including a number of photovoltaic arrays, a number of inverters, and a transformer, the method comprising:
operating the photovoltaic system including said number of photovoltaic arrays, said number of inverters and said transformer to provide maximum efficiency of power conversion therefrom;
maximizing power output from said number of photovoltaic arrays;
employing as said number of photovoltaic arrays a plurality of photovoltaic arrays; and
paralleling the outputs of said plurality of photovoltaic arrays; and
paralleling the outputs of said plurality of photovoltaic arrays during a number of hours before noon and a number of hours after noon.

2. A method of power tracking for a photovoltaic system including a number of photovoltaic arrays, a number of inverters, and a transformer, the method comprising:
operating the photovoltaic system including said number of photovoltaic arrays, said number of inverters and said transformer to provide maximum efficiency of power conversion therefrom;
maximizing power output from said number of photovoltaic arrays;
employing as said number of photovoltaic arrays a plurality of photovoltaic arrays;
employing as said number of inverters a plurality of inverters;
for each of said plurality of photovoltaic arrays, powering a corresponding one of said plurality of inverters from a corresponding one of said plurality of photovoltaic arrays; and
operating each of said plurality of photovoltaic arrays at a corresponding independent maximum power point during a time of about peak or peak energy production.

3. A method of power tracking for a photovoltaic system including a number of photovoltaic arrays, a number of inverters, and a transformer, the method comprising:
operating the photovoltaic system including said number of photovoltaic arrays, said number of inverters and said transformer to provide maximum efficiency of power conversion therefrom;
maximizing power output from said number of photovoltaic arrays;
employing as said number of photovoltaic arrays a plurality of photovoltaic arrays;
employing as said number of inverters a plurality of inverters; and
for each of said plurality of photovoltaic arrays, powering a corresponding one of said plurality of inverters from a corresponding one of said plurality of photovoltaic arrays.

4. The method of claim 3 further comprising:
powering the transformer from each of said plurality of inverters; and
powering a load from the transformer.

5. A method of power tracking for a photovoltaic system including a number of photovoltaic arrays, a number of inverters, and a transformer, the method comprising:
operating the photovoltaic system including said number of photovoltaic arrays, said number of inverters and said transformer to provide maximum efficiency of power conversion therefrom;
maximizing power output from said number of photovoltaic arrays;
employing two photovoltaic arrays as said number of photovoltaic arrays;
employing two inverters as said number of inverters;
initially paralleling the outputs of the two photovoltaic arrays and powering one of the two inverters from the paralleled outputs;
determining when power output from said one of the two inverters exceeds a predetermined power percentage and responsively powering said one of the two inverters from one of the two photovoltaic arrays and powering the other one of the two inverters from the other one of the two photovoltaic arrays;

operating said one of the two inverters at the maximum power point of the one of the two photovoltaic arrays; and operating the other one of the two inverters at the maximum power point of the other one of the two photovoltaic arrays.

6. The method of claim 5 further comprising:

determining when power output from both of the two inverters falls below a predetermined power percentage; and determining when said one of the two inverters has operated for longer than a predetermined time during a predetermined time interval, and responsively disabling said one of the two inverters, paralleling the outputs of the two photovoltaic arrays and powering the other one of the two inverters from the paralleled outputs.

7. A power conversion system comprising:
a number of photovoltaic arrays;
a number of inverters;
a transformer; and
a processor structured to control said number of inverters and operate said power conversion system to provide maximum efficiency of power conversion by said number of photovoltaic arrays, said number of inverters and said transformer, and to maximize power output from said number of photovoltaic arrays,
wherein said number of photovoltaic arrays is two photovoltaic arrays each having an output; wherein said number of inverters is two inverters; and wherein said processor is structured to selectively cause: a corresponding one of the inverters to be powered from a corresponding one of the two photovoltaic arrays.

* * * * *